No. 746,875. PATENTED DEC. 15, 1903.
F. OTTE.
LISTER PLOW AND DRILL.
APPLICATION FILED MAR. 11, 1903.
NO MODEL. 2 SHEETS—SHEET 1.
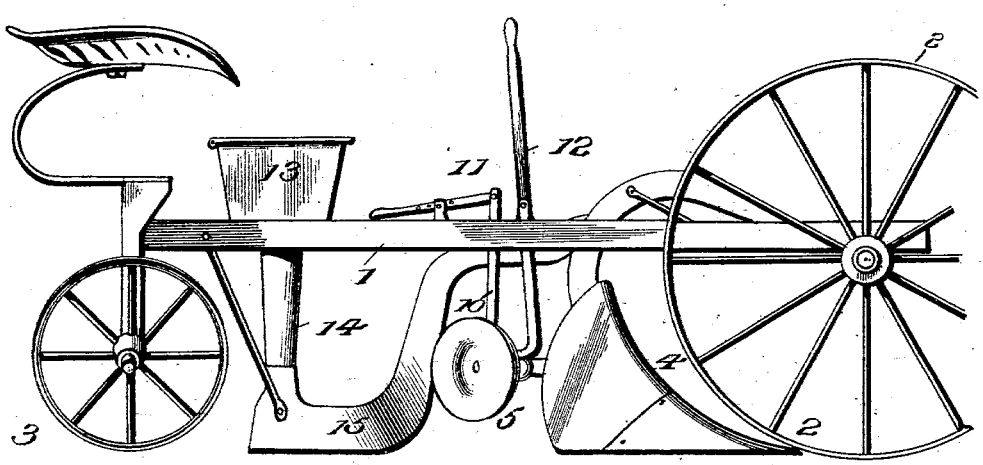
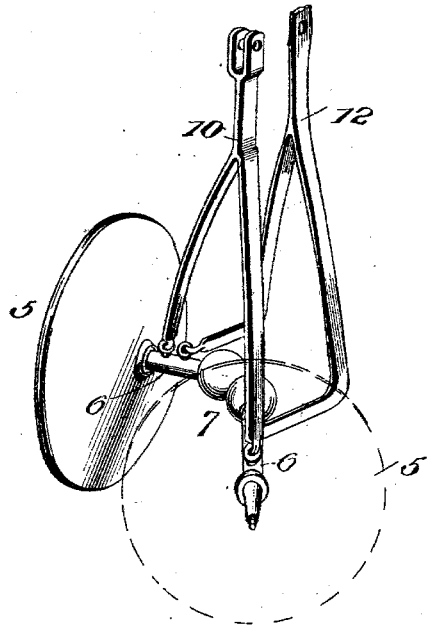
Inventor
Frank Otte
Witnesses By Attorneys No. 746,875. PATENTED DEC. 15, 1903.
F. OTTE.
LISTER PLOW AND DRILL.
APPLICATION FILED MAR. 11, 1903.
NO MODEL. 2 SHEETS—SHEET 2.
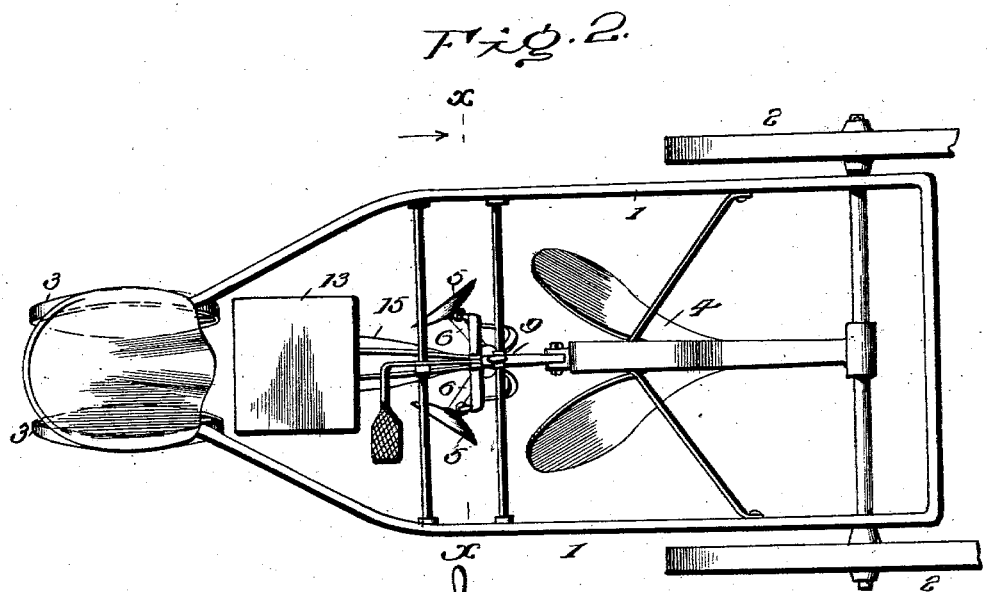
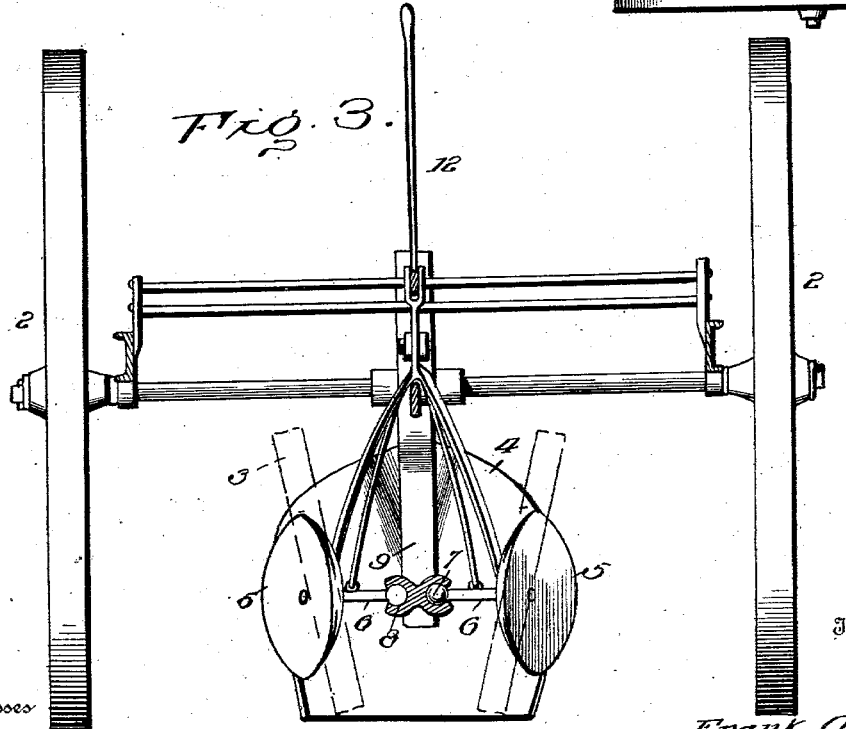
Witnesses Inventor
Frank Otte
By R. S. & A. B. Lacey
Attorneys No. 746,875. Patented December 15, 1903.

UNITED STATES PATENT OFFICE.

FRANK OTTE, OF CLARINDA, IOWA.

LISTER PLOW AND DRILL.

SPECIFICATION forming part of Letters Patent No. 746,875, dated December 15, 1903.

Application filed March 11, 1903. Serial No. 147,331. (No model.)

*To all whom it may concern:*

Be it known that I, FRANK OTTE, a citizen of the United States, residing at Clarinda, in the county of Page and State of Iowa, have invented certain new and useful Improvements in Lister Plows and Drills, of which the following is a specification.

In sowing grain, and particularly planting corn, failure to germinate has been attributable in a great measure to depositing the grain upon the bottom of the furrow, where in the event of a cold damp spring the same rots.

This invention aims to deposit the grain upon a bed of loose earth, which permits excessive moisture to pass off and prevents washing out of grain on hilly ground, thereby allowing the grain to germinate without necessitating replanting.

The invention consists, essentially, of an implement provided with an opener, means for following immediately in the wake of the opener to partially fill the furrow, and seeding mechanism for depositing the grain upon the loose earth in the bottom portion of the furrow, and a coverer for filling the furrow and slightly compressing the earth, so as to render same firm.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a side elevation of an implement embodying the invention. Fig. 2 is a top plan view thereof. Fig. 3 is a transverse section on the line X X of Fig. 2 looking to the front, as indicated by the arrows. Fig. 4 is a detail perspective view of means for adjusting the filling-disks.

Corresponding and like parts are referred to in the following description and indicated in all the views of the drawings by the same reference characters.

The framework of the implement is indicated at 1 and is mounted upon front wheels 2 and rear wheels 3, the latter acting in the capacity of coverers to fill in the furrow and compress the earth.

The furrow-opener consists of a double-moldboard plow 4, which may be of any structural type and adapted to open the ground to any desired depth.

The means for partially filling the furrow consist of disks 5, located immediately in the rear of the furrow-opener 4 and so arranged as to throw the required amount of loose earth into the furrow to form the bed for the grain. As shown, these disks are applied to the outer ends of shafts 6 and are adjustable to admit of throwing a greater or less amount of earth into the furrow. The shafts 6 are provided at their inner ends with balls 7, which are fitted into sockets 8 at the outer end of a bracket-arm 9, secured to the standard or other convenient portion of the furrow-opener. The connection at the inner end of the shafts 6 is of the universal type and admits of said shafts moving freely in any direction. To vary the filling in of the furrow, the disks 5 may be adjusted either vertically or angularly, or both, the vertical adjustment being effected by upward movement of the outer ends of the shaft 6 and the angular adjustment resulting by moving the outer ends of shafts 6 either forward or rearward. A forked hanger 10 connects at its upper end with a lever 11, by means of which vertical adjustment of the disks may be had. A forked lever 12, fulcrumed intermediate of its ends to the frame, has its fork members loosely connected to the shafts 6 near their outer ends, and this lever admits of moving the disks 5 forward or rearward, whereby their divergence may be regulated. By moving the levers 11 and 12 the shafts 6 may be adjusted vertically and move either forwardly or rearwardly at their outer ends, whereby the filling-disks 5 receive a resultant adjustment of the combined movement of the two levers.

The seeding mechanism comprises hopper 13, spout 14, and runner or furrow-opener 15, the latter operating in the rear of the filling-disks 5, so as to deposit the grain upon the loose bed, whereby the advantages of the present invention are attained. The coverers 3 operate in rear of the seed-depositing mechanism and complete the filling of the furrow and compress the earth with a sufficient degree to insure proper protection and germination of the seed.

In the operation of the implement the ground is opened by the plow 4, and the disks 5 serve to partly fill the bottom portion of the furrow, whereby a bed for the grain is provided, the seed being deposited on said bed by the seeding or drilling mechanism and covered by the parts 3.

Having thus described the invention, what is claimed as new is—

1. In a lister plow and drill, the combination of a furrow-opener, means operating in the rear of the opener to partly fill the furrow to form a bed of loose earth, said means consisting of oppositely-disposed shafts loosely supported at their inner ends and provided with disks at their outer ends, means for moving said shafts at their outer ends to vary the filling in of the disks carried thereby, and a seeding mechanism for depositing the grain upon said bed, substantially as set forth.

2. In a lister plow and drill, the combination of a furrow-opener, means operating in the rear of the opener to partly fill the furrow to form a bed of loose earth, said means consisting of oppositely-disposed shafts loosely supported at their inner ends and provided with disks at their outer ends, means for swinging the outer ends of said shafts forward or rearward to change their inclination and the divergence of the disks carried thereby to vary the depth of said bed, and a seeding mechanism for depositing the grain upon said bed, substantially as specified.

3. In a lister plow and drill, and in combination with the furrow-opener and seeding mechanism, means intermediate of the opener and seeder for partly filling the furrow to form a bed for the grain, said means consisting of oppositely-disposed shafts loosely supported at their inner ends and provided with disks at their outer ends, means for swinging the outer ends of said shafts forward or rearward, and other means for swinging the outer ends of the shafts up or down, the two means providing for horizontal and vertical angular adjustment of the said shafts, substantially as described.

4. In a lister plow and drill, and in combination with the furrow-opener and seeding mechanism, filling-disks intermediate of said opener and seeder for throwing loose earth into the furrow to form a bed for the grain, angularly-disposed shafts carrying the said disks at their outer ends and provided with balls at their inner ends, a support provided with sockets receiving the ball ends of the shafts, a forked hanger and a forked lever connected with said shafts to swing their outer ends vertically and laterally, substantially as and for the purpose specified.

In testimony whereof I affix my signature in presence of two witnesses.

FRANK OTTE. [L. S.]

Witnesses:
H. E. PARSLOW,
J. K. SUNDERNAN.